INVENTOR.
PIERINO P. ROBBIANO

United States Patent Office 3,501,689
Patented Mar. 17, 1970

3,501,689
MAGNETOMETER
Pierino P. Robbiano, Menlo Park, Calif., assignor to Varian Associates, Palo Alto, Calif., a corporation of California
Continuation of application Ser. No. 333,951, Dec. 27, 1963. This application June 6, 1966, Ser. No. 555,347
Int. Cl. G01n 27/72
U.S. Cl. 324—.5                           3 Claims

ABSTRACT OF THE DISCLOSURE

There is disclosed a self-oscillating spin precession magnetometer adapted to be used in detecting the azimuth and elevation of external magnetic fields, for example, the earth's field. A low frequency magnetic field, as of 500 c.p.s., is applied to a magnetometer resulting in the modulation of the total field including the earth's field as the system is rotated in the earth's field. The magnetometer output signal which results as the system is rotated is then phase compared to a reference signal from which the azimuth and elevation of the earth's field can be determined.

---

Figure 1:
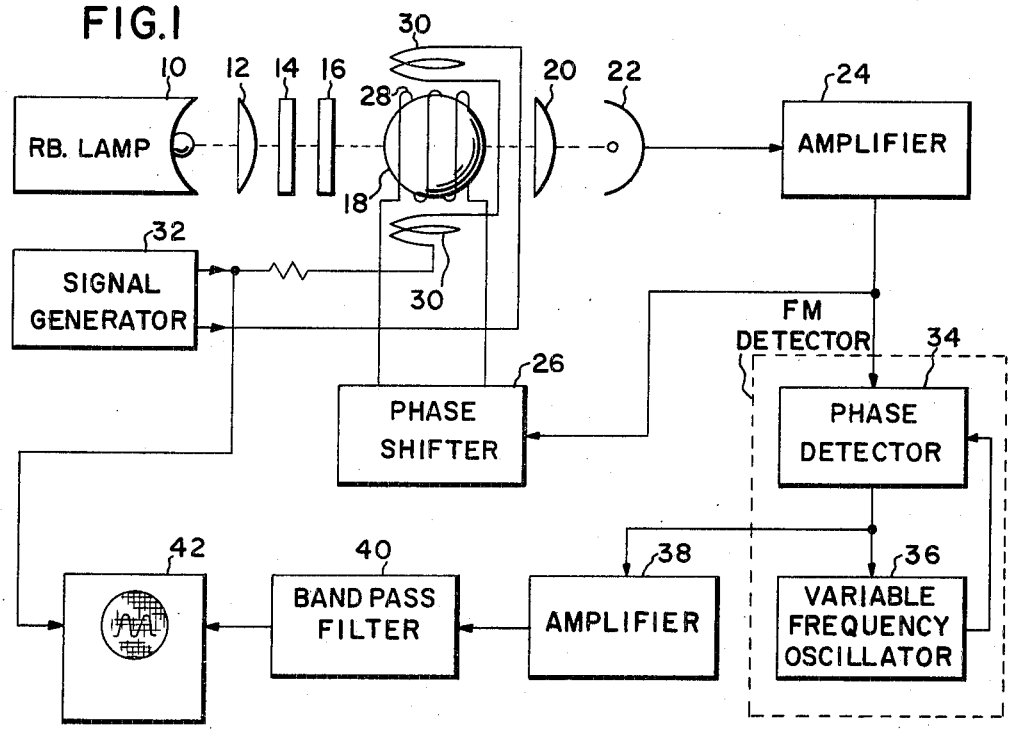

This application is a continuation of application Ser. No. 333,951, filed Dec. 27, 1963, now abandoned.

This invention relates to a magnetometer, and in particular to a magnetometer that may be utilized to sense magnetic north-south or azimuth, and magnetic dip angles.

Presently known magnetometer systems that are used to obtain precise measurement of weak magnetic fields, such as the earth's field, employ optical pumping techniques. In such systems, a light source provides radiation to an absorption cell containing a vapor, the light source and absorption cell both employing an element such as rubidium (Rb), for example. Rubidium light photons from the light source pump Rb atomic particles in the vapor to higher energy levels, thereby increasing the transparency of the vapor cell.

The application of a weak alternating magnetic field perpendicular to the ambient field and varying at the Larmor frequency will result in a redistribution of atoms in a manner which is competitive with the optical pumping process. The result is an intensity modulation of the pumping light passing through the absorption cell at the Larmor frequency. This light modulation may be observed with a monitoring photocell properly disposed at the end of the Rb vapor cell. The frequency of the observed modulation will be dependent upon the ambient magnetic field.

If the modulation signal is amplified, shifted in phase, and presented as a current to the solenoid which produces the weak alternating field at the gas cell, the process of light modulation at the Larmor rate will continue automatically. The frequency of the resulting oscillation will vary with changes in the ambient field. Means are provided to measure and translate this frequency to magnetic field intensity. Such systems have proven very effective for measuring fields as low as .01 gauss, for example, and have been used for plotting the earth's magnetic field and for other scientific experiments. A detailed description of such apparatus may be found in copending U.S. patent application Ser. No. 56,484, filed Sept. 16, 1960, now U.S. Patent 3,252,081, and assigned to the same assignee.

With the recent advent of space exploration and the requirement for highly accurate navigational instruments, it would be desirable to employ a magnetometer structure for percisely sensing magnetic north or south, as well as to determine the magnetic dip angle at any point on the earth or in space. With such information, it would be possible to provide a directionally stable platform for a magnetometer sensor to be used with a space vehicle, for example. Also, the knowledge of the magnetic dip angle or magnetic azimuth may be used for anomaly detection or locating subsurface deposits that have an effect on the direction of the earth's magnetic flux lines.

An object of this invention is to provide a novel and improved magnetometer system.

Another object of this invention is to provide a magnetometer system that affords the detection of magnetic azimuth and magnetic dip angle in a simple manner.

In accordance with this invention an optically pumped magnetic oscillator is utilized to detect the intensity of the earth's magnetic field. A modulating field generating means is fixed orthogonally relative to the optical pumping beam and the oscillator and field generating means are rotated with respect to the earth's field. The modulation provided by the field generating means varies the total magnetic field. During rotation the total field deviation will vary and when the total magnetic field deviation measured is a minimum, then the optical pumping beam is aligned with the earth's field, either with respect to azimuth or dip, depending upon the orientation of the axis of the modulating field generating means.

In an embodiment of this invention, a system for sensing magnetic azimuth and dip angle comprises an optically pumped magnetometer oscillator having an absorption cell that is located between a pair of modulating coils in fixed relation. The modulating coils provide a constant amplitude, alternating magnetic field $H_m$ that is substantially perpendicular to an optical beam axis of a light source, which effects optical pumping of a vapor contained within the absorption cell. A photocell detects the intensity of the light that emanates from the absorption cell and provides an electrical output signal having an amplitude related to the light output intensity. A radio frequency coil encompassing the absorption cell is coupled to the photocell output in a feedback loop to produce continuous oscillation at the Larmor frequency.

Simultaneously, a sample signal from the oscillator is fed to a frequency modulation discriminator circuit. The amplitude of the signal output from this discriminator is dependent upon the amplitude of deviation of the ambient magnetic field caused by the modulating field $H_m$, since the frequency of the oscillator is directly proportional to the instantaneous ambient field intensity. Due to the low frequency field modulation employed, the oscillator has no difficulty in following the field modulation for nominal values to the earth's magnetic field intensities.

Accordingly, if the orientation of the modulating field $H_m$, relative to the earth's field $H_e$ is changed, while still maintaining the condition of perpendicularity between the modulating field $H_m$ and the optical beam axis, a variation in the amplitude of the discriminator output will be observed. The output of the discriminator will be a minimum when the modulating field is perpendicular to the earth's field vector. By proper orientation of the magnetometer sensor and modulating field configuration, one may use the discriminator output to indicate direction of the earth's field vector with respect to azimuth or dip angle.

Figure 2A:
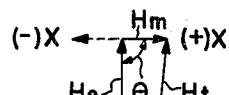
Figure 2B:
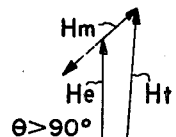
Figure 2C:
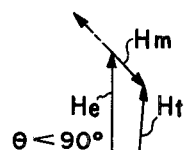

The invention will be described in greater detail with reference to the drawings in which:

FIG. 1 is a schematic and block diagram of one embodiment of a magnetometer, in accordance with the invention; and FIGS. 2A–2C are illustrative vector diagrams to aid in the explanation of the invention.

With reference to FIG. 1, an embodiment of the inventive magnetometer comprises a rubidium (Rb) lamp 10 that emits a steady beam of light having components of 7800 angstroms and 7948 angstroms, respectively. The lamp 10 is a spectral lamp of Rb vapor, and is operated as an electrodeless discharge lamp with an excitation frequency of about 120 megacycles per second. The light or radiation from the lamp 10 is directed through an optical lens 12 to an interference filter 14, which rejects the 7800 A. component and passes only the $D_1$ rubidium line or the 7948 A. component of the Rb light spectrum. The filtered light is applied to a circular polarizer 16, and the polarized beam passes to a rubidium vapor absorption cell 18.

The polarized radiation optically pumps the Rb vapor in the absorption cell 18, causing transitions between Zeeman or $m$ sublevels, in a well known manner. Atoms are trapped thereby in the $2S_{1/2}$, $m=+2$ state and the vapor cell 18 becomes transparent. Light that emanates from the absorption cell 18 is directed by an optical lens 20 to a photodetector or photocell 22, which generates an electrical output signal that has an amplitude proportional to the intensity of light that emanates from the vapor cell 18.

The photocell output signal is applied to an amplifier 24, which provides an amplified output signal to a phase shifter 26 that serves to vary the phase of the output signal by approximately 90°. The phase shifted signal is applied to a coil 28 that encompasses the absorption cell 18, the axis of the coil being substantially collinear with the axis of the optical beam. The closed feedback loop formed by the photocell 22, phase shifter 26 and coil 28 provides sustained oscillation at a resonant frequency proportional to the ambient magnetic field, such as 240 kilocycles per second, for example.

In accordance with this invention, a pair of modulating coils 30 are located adjacent the absorption cell 18 so that the common axis of the coils 30 are perpendicular to the optical beam axis. The modulating coils 30, which may be a simple Helmoltz coil system, are coupled to a signal generator 32 that provides a low frequency alternating signal of constant amplitude, such as 500 cycles per second, for example. As a result, a modulating field $H_m$ is applied to the absorption cell 18 having its magnetic vector orthogonally disposed relative to the axis of the optical beam. The modulating field $H_m$, in effect, amplitude modulates the earth's magnetic field $H_e$. In turn, the resonant frequency of the oscillating magnetometer, that is the 240 kc. signal, is frequency modulated by the variation of the total magnetic field vector $H_t$, which is the vector sum of $H_e$ and $H_m$.

In FIGS. 2A–C, the vector relationships between $H_e$ and $H_m$ are illustrated respectively for a condition of quadrature, and for conditions when the angle $\theta$ between $H_e$ and $H_m$ is greater and less than 90°. It is known that the total magnetic field vector $H_t$ is generally equal to $$\sqrt{H_e^2+H_m^2-2H_eH_m\cos\theta}$$

where $\theta$ is the angle between $H_e$ and $H_m$. When $\theta$ is 90°, as shown in FIG. 2A, it can be seen that the ability of $H_m$ to vary the amplitude of $H_e$ about its ambient value will be a minimum. This will result in a minimum output of fundamental modulation frequency from a frequency discriminator circuit coupled to the output of photocell 22. However, the output of the discriminator is not a null in the usual sense, because an output signal having a frequency twice the modulating frequency $f_m$ will be observed.

An expansion of $$H_t=\sqrt{H_e^2+H_m^2-2H_eH_m\cos\theta}$$

may be performed to predict the existence of $2f_m$. With reference to FIG. 2A, it can be seen that as $H_m$ varies from its maximum (+) X value through zero to maximum (−) X, where X is the direction perpendicular to $H_e$, the minimum value of $H_t$ will never be less than $H_e$. As a consequence, during one complete cycle of modulation $H_m$ will vary from (+) X, 0, (−) X, 0, to (+) X, and the variation of $H_t$ from maximums to minimums will occur twice as fast or at $2f_m$. However, as $\theta$ varies from 90°, as depicted in FIGS. 2B–C, $H_t$ will differ in magnitude from $H_e$ at the fundamental modulation frequency $f_m$. The magnitude of deviation from $H_e$ will increase as $\theta$ varies from 90° as predicted in the equation for $H_t$ above.

The 240 kc. oscillating signal that is frequency modulated by the 500 cycle per second signal is received by the photodetector 22 and passed through the amplifier 24 to an FM detector or frequency discriminator circuit comprising a phase detector 34 and variable frequency oscillator 36. The oscillator 36 provides a nominal frequency of 240 kc., which is fed to the phase detector 34 for comparison with the resonant frequency received from the oscillating magnetometer cell 18.

The phase detector 34 generates an error signal whose amplitude is proportional to the deviation of the rubidium oscillator frequency with respect to the frequency of oscillator 36. The frequency of the error signal is the same as the frequency of $H_e$ deviation caused by $H_m$. Application of the error signal to a voltage variable capacitor in the R.F. tank circuit of oscillator 36 causes this oscillator to be locked in phase and frequency to the resonant frequency of the magnetometer oscillator. The error signal from phase detector 34 is also fed to an A.C. amplifier 38. The amplified modulating signal is applied to a narrow bandpass filter 40, which rejects all but the fundamental 500 cycles per second modulating field frequency signal. The filtered signal is then directed to a display or oscilloscope 42, which receives a 500 cycle per second reference signal from the generator 32 for establishing a phase reference.

To obtain magnetic azimuth, the magnetometer oscillator including the lamp 10 and vapor cell 18 are slowly rotated together with the modulating coils 30 around a vertical axis. For this measurement, the maximum field axis of the modulating coils 30 should be horizontal and also normal to the magnetometer optical axis. When $H_m$ is in quadrature with $H_e$, the deviation in the total field $H_t$ that will be measured will be at a minimum, and therefore, the amplitude of the fundamental frequency of $H_m$ on the oscilloscope will be at a minimum. In effect, the fundamental signal of 500 cycles per second received from the generator 32 drops out and only the second harmonic component is displayed. If necessary, the displayed signal may be amplified by the use of a bandpass filter that passes the second harmonic of $H_m$. When this condition is observed, the optical axis is collinear with magnetic north-south. At this point, if desirable, other inherent properties of the rubidium magnetometer related to direction of light polarization by the polarizer 16, or the phase of the feedback signal necessary at coil 18 to maintain oscillation may be used to differentiate between the north and south directions.

After determining magnetic azimuth, the same principles may be applied to obtain the magnetic dip angle at the location under investigation. However, in such case, the modulating coils 30 are oriented so that their maximum intensity axis is in a vertical plane. Rotation of the magnetometer sensor coil assembly around a horizontal axis can be used to indicate alignment with the magnetic dip as evidenced by a null in the fundamental modulation frequency signal at the output of the filter 40.

Another useful characteristic of the frequency discriminator output signal is that a 180° phase shift occurs in this signal in passing through the null in fundamental modulation frequency. This results from a change in sign of the $2H_eH_m\cos\theta$ term in the total field equation as $\theta$ goes through 90°. This change in phase of signal from filter 40 is readily detected at the oscilloscope 42 when the reference modulation signal from signal generator 32 is used to synchronize the horizontal sweep. Such a change in phase is useful to provide sense of direction with respect to azimuth or dip.

When determining both the azimuth and dip angle, inherent dead zones of operation for the oscillating rubidium magnetometer sensor must be considered. These dead zones are confined to conical regions centered on the optical axis at each end of the sensor, and to a region described by a tapered section of rotation about the optical axis whose center is perpendicular to this axis. Such dead zones may be eliminated by the use of two or three axis systems, in a well known manner.

The unique characteristic of the oscillating optically pumped magnetometer also makes it useful for determination of magnetic field direction in another novel manner. With reference to FIG. 2A, it is seen that as $\theta$ deviates from 90° the deviation in $H_t$ due to $H_m$ will vary as predicted by the field equation for $H_t$. In such case, if the amplitude of the modulating field is kept constant then its direction with respect to the earth's field can be determined as a function of the amplitude of the frequency deviation of the oscillating magnetometer frequency. For this application the axis of the modulating coil may be arranged either perpendicularly or coaxially with the optical axis of the magnetometer. In practice, it is most convenient to wind the modulating coil so as to be coaxial with the $H_1$ coil 28. Once the amplitude of the modulating field and the stability of the frequency modulation detector are established, a calibration may be made relating the angle between modulating coil axis and the earth's field to the output of the FM detector. This information then can serve as a basis for orientation reference with respect to the earth's field. It can be seen that by utilization of the unique features of the oscillating optical pumped magnetometer together with appropriately directed modulating fields, a device which will either home on the earth's field vector or provide an orientation reference may be realized.

What is claimed is:

1. Apparatus for determining the direction in azimuth and elevation of the lines of flux of an ambient unidirectional magnetic field comprising: a self oscillating magnetometer for providing an oscillating signal at a frequency proportional to such unidirectional magnetic field, including a radiation emitter and an absorption cell; means for projecting radiation from said emitter onto said cell; radiation sensing means located adjacent to the absorption cell for generating an electrical signal in response to radiation emanating from said cell; feedback means coupled to said cell for sustaining a resonant frequency signal which is proportional to the intensity of the magnetic field coupled to said cell; a variable frequency oscillator coupled to the output of said cell; means for locking said oscillator to the phase and frequency of the resonant frequency; means for amplitude modulating the unidirectional field whereby the oscillating signal is frequency modulated; means coupled to the oscillator locking means for determining the magnitude of modulation of the oscillating signal as the modulation of the unidirectional magnetic field is varied, whereby an orientation reference relative to the field is determined.

2. Apparatus for determining the azimuth and dip angle of the earth's magnetic field lines comprising: a magnetometer oscillator for providing an oscillating signal at a frequency proportional to the earth's magnetic field, including a light source and a vapor absorption cell located along an optical axis; a photoelectric cell located adjacent to the obsorption cell and spaced from such lamp source; an amplifier coupled to the output circuit of said photoelectric cell; a radio frequency coil encompassing said absorption cell having an axis collinear with the light beam emanating from said light source; a phase shifter couple between said amplifier and said ratio frequency coil; a phase detector coupled to the output of said amplifier; a variable frequency oscillator coupled to the output of said phase detector; and means coupling the output of said variable frequency oscillator to an input of said phase detector for comparing the variable frequency oscillator output signal with the signal received from said amplifier for controlling the frequency of said variable frequency oscillataor; a bandpass filter coupled to the output of said phase detector; a modulating coil, having an axis substantially perpendicular to the optical axis, surrounding the obsorption cell; a signal generator coupled to said modulating coil and providing an alternating signal; means coupled to the output circuit of said filter and to said signal generator for displaying an amplitude varying signal as the axis of the modulating coil is changed relative to the unidirectionl magnetic field.

3. Apparatus for determining the direction in azimuth and elevation of the lines of flux of an ambient unidirection magnetic field comprising: a self-oscillating magnetometer for providing a frequency modulated oscillating signal at a frequency proportional to such unidirectional magnetic field, including a rubidium lamp and a rubidium vapor absorption cell; an optical lens for projecting light from such lamp along a predetermined optical axis; an interference filter and a circular polarizer located between such lamp and absorption cell along such optical axis; a photoelectric cell located adjacent to the absorption cell and spaced from such lamp; an amplifier coupled to the output circuit of said photoelectric cell; a ratio frequency coil encompassing said absorption cell having an axis collinear with the optical axis; a phase shifter coupled between said amplifier and said radio frequency coil; a phase detector coupled to the output of said amplifier; a variable frequency oscillator coupled to the output of said phase detector; and means coupling the output of said variable frequency oscillator to an input of said phase detector for comparing the variable frequency oscillator output signal with the signal received from said amplifier for controlling the frequency of said variable frequency oscillator; a bandpass filter coupled to the output of said phase detector; a modulating coil having an axis substantially perpendicular to the optical axis, said coil adapted to rotate relative to the magnetic field but maintaining its substantially perpendicular relation to the optical axis; a signal generator coupled to said modulating coil for providing an alternating signal to said coil; an oscilloscope coupled to the output circuit of said filter and to said signal generator for displaying an alternating signal that varies in amplitude as the axis of the modulating coil is rotated relative to the unidirection magnetic field.

References Cited

UNITED STATES PATENTS

| 3,158,802 | 11/1964 | Jung | 324—0.5 |
| 3,173,082 | 3/1965 | Bell | 324—0.5 |
| 3,206,671 | 4/1965 | Colegrove | 324—0.5 |

OTHER REFERENCES

"Principles of Operation of the Rubidium Vapor Magnetometer," Bloom, Applied Optics, January 1962, pp. 61–68.

"Rubidium Vapor Magnetometer," Parsons, Journal of Scientific Instruments, February 1962, pp. 292–299.

"Optically Pumped Nuclear Magnetometer," Schearer, Review of Scientific Instruments, December 1963, pp. 1363–1366.

"Magnetometer System for Orientation, in Space," DeBolt, Electronics, April 8, 1960, pp. 55–58.

RUDOLPH V. ROLINEC, Primary Examiner

MICHAEL J. LYNCH, Assistant Examiner